(12) United States Patent
Gotfredsen (10) Patent No.: US 9,689,174 B2
(45) Date of Patent: Jun. 27, 2017

(54) WIND TURBINE WITH YAW BEARING LIFTING DEVICE

(71) Applicant: Siemens Aktiengesellschaft, Munich (DE)

(72) Inventor: Andreas Gotfredsen, Aarhus C (DK)

(73) Assignee: SIEMENS AKTIENGESELLSCHAFT, Munich (DE)

(*) Notice: Subject to any disclaimer, the term of this patent is extended or adjusted under 35 U.S.C. 154(b) by 80 days.

(21) Appl. No.: 14/318,603

(22) Filed: Jun. 28, 2014

(65) Prior Publication Data

US 2015/0047270 A1 Feb. 19, 2015

(30) Foreign Application Priority Data

Aug. 13, 2013 (EP) .................................... 13180231

(51) Int. Cl.
*E04H 12/34* (2006.01)
*E04H 12/00* (2006.01)
*F03D 7/02* (2006.01)
*F03D 11/04* (2006.01)
*F03D 80/70* (2016.01)
(Continued)

(52) U.S. Cl.
CPC ............. *E04H 12/00* (2013.01); *E04H 12/34* (2013.01); *F03D 13/20* (2016.05); *F03D 80/50* (2016.05); *F03D 80/70* (2016.05); *F05B 2230/80* (2013.01); *F05B 2240/50* (2013.01); *F05B 2240/916* (2013.01); *Y02E 10/726* (2013.01); *Y02E 10/728* (2013.01); *Y02P 70/523* (2015.11)

(58) Field of Classification Search
CPC ........ F03D 7/02; F03D 11/04; F03D 11/0016; F03D 11/0008; F16C 17/00; E04B 7/163; E06B 7/14; E04D 13/0358; E04H 12/00; E04H 12/34
USPC ...................................................... 52/40, 831
See application file for complete search history.

(56) References Cited

U.S. PATENT DOCUMENTS 2,086,279 A * 7/1937 McDonald, Jr. ........ F03D 7/026
290/44
3,677,518 A 7/1972 Buys
(Continued)

FOREIGN PATENT DOCUMENTS

| EP | 2306008 A2 | 4/2011 |
| EP | 2388480 A1 | 11/2011 |
| EP | 2461021 A1 | 6/2012 |

*Primary Examiner* — Phi A
(74) *Attorney, Agent, or Firm* — Beusse Wolter Sanks & Maire (57) ABSTRACT

A wind turbine with a tower, a nacelle and a yaw bearing, wherein the yaw bearing is arranged and prepared for rotating the nacelle relative to the tower around a yaw axis is provided. The yaw bearing has a first yaw bearing component which is fixed to the tower, a second yaw bearing component which is fixed to the nacelle, and at least one sliding component which is located between the first yaw bearing component and the second yaw bearing component. The wind turbine is prepared and arranged for housing at least one lifting device for lifting the nacelle relative to the tower such that the sliding component can be removed. Furthermore, a method of lifting the nacelle relative to the tower is provided. Thus, the sliding component may be removed and the removed sliding component may be replaced by a re-placement sliding component.

19 Claims, 5 Drawing Sheets

(51) Int. Cl.
*F03D 13/20* (2016.01)
*F03D 80/50* (2016.01)

(56) References Cited

U.S. PATENT DOCUMENTS

| | | | | |
|---|---|---|---|---|
| 4,435,646 | A * | 3/1984 | Coleman | F03D 1/0658 290/44 |
| 4,557,666 | A * | 12/1985 | Baskin | F03D 1/0658 416/11 |
| 5,151,610 | A * | 9/1992 | St-Germain | F03D 1/02 290/55 |
| 6,285,090 | B1 * | 9/2001 | Brutsaert | F03D 1/003 290/44 |
| 6,408,575 | B1 * | 6/2002 | Yoshida | E04H 12/34 52/123.1 |
| 7,436,083 | B2 * | 10/2008 | Shibata | F03D 1/025 290/44 |
| 7,821,148 | B2 * | 10/2010 | Piasecki | F03D 1/0658 290/44 |
| 7,944,077 | B2 * | 5/2011 | Fischer | F03D 7/0204 290/55 |
| 7,944,079 | B1 * | 5/2011 | Signore et al. | 290/55 |
| 7,969,037 | B2 * | 6/2011 | Segovia | F03D 15/00 290/43 |
| 8,556,591 | B2 * | 10/2013 | Koronkiewicz | F03D 1/003 415/122.1 |
| 9,003,954 | B2 * | 4/2015 | Salter et al. | 92/72 |
| 9,022,739 | B2 * | 5/2015 | Krishnan | B66C 23/207 416/146 R |
| 2012/0099993 | A1 * | 4/2012 | Guerenbourg et al. | 416/174 |
| 2012/0201677 | A1 * | 8/2012 | Krishnan et al. | 416/9 |
| 2013/0216403 | A1 * | 8/2013 | Salter et al. | 417/222.1 |
| 2014/0321781 | A1 * | 10/2014 | Pedersen et al. | 384/320 |

* cited by examiner

WIND TURBINE WITH YAW BEARING LIFTING DEVICE

CROSS REFERENCE TO RELATED APPLICATIONS

This application claims priority to and the benefit of European Application No. EP13180231 filed Aug. 13, 2013, incorporated by reference herein in its entirety.

FIELD OF THE INVENTION

The present invention relates to a wind turbine with a lifting device. Furthermore, the invention relates to a method of lifting a nacelle of a wind turbine relative to a tower of the wind turbine

BACKGROUND OF THE INVENTION

A wind turbine with a tower and a nacelle typically comprises a yaw bearing by which the nacelle can be rotated relative to the tower. The yaw bearing may comprise sliding components, for example bearing pads. These bearing pads may be needed to be exchanged from time to time. An exchange of a sliding component may be necessary e.g. because of wear.

However, this exchange is currently very complex and costly. Until now, a crane typically lifts the nacelle of a wind turbine in order to remove and exchange the sliding components. Due to the heavy weight of the nacelle, weighing typically several hundreds of tons, this is very expensive and complicated. Particularly in offshore applications, i.e. offshore wind turbines, an exchange of the sliding components is difficult.

SUMMARY OF THE INVENTION

Thus there exists an urgent need to provide a way how to remove a sliding component, e.g. a top axial bearing pad, of a yaw bearing of a wind turbine.

This objective is achieved by the independent claims. The dependent claims describe advantageous developments and modifications of the invention.

In accordance with aspects of the invention there is provided a wind turbine with a tower, a nacelle and a yaw bearing, wherein the yaw bearing is arranged and prepared for rotating the nacelle relative to the tower around a yaw axis. The yaw bearing comprises a first yaw bearing component which is fixed to the tower, a second yaw bearing component which is fixed to the nacelle, and at least one sliding component which is located between the first yaw bearing component and the second yaw bearing component. Furthermore, the wind turbine is prepared and arranged for housing at least one lifting device for lifting the nacelle relative to the tower such that the sliding component can be removed.

A wind turbine, which may also be referred to as a wind turbine engine, a wind power plant or a wind charger, converts kinetic energy from wind, also called wind energy, into mechanical energy. Apart from the tower, the nacelle and the yaw bearing, the wind turbine may also comprise a hub, a rotor, a generator, and one or several rotor blades.

A yaw bearing may in general comprise a rolling element bearing with balls or rollers which aim reducing friction between a first bearing component and a second bearing component. Rolling elements that are used in rolling element bearings may be cylindrical rollers, tapered rollers, spherical rollers or needles. Another alternative for the yaw bearing is a fluid bearing. A fluid bearing supports the bearing's loads solely on a layer of liquid or gas, in particular a thin layer of liquid or gas with a layer thickness below 1 mm (millimeter). Hydrostatic bearings are externally pressurized fluid bearings, where a fluid, e.g. oil, water or air, is pressurized by a pump. Hydrodynamic bearings rely on a high speed of a journal, a journal being a part of a shaft resting on the fluid, to pressurize the fluid in a wedge between the contact faces of the bearing components.

Advantageously, the yaw bearing is a fluid bearing or gliding bearing and the sliding component is a so called bearing pad.

The lifting device lifts the nacelle relative to the tower in a certain lifting direction. Assuming that for example the tower stands in a vertical direction, then the lifting device may lift the nacelle horizontally, vertically, oblige or slanting, or in an arch-shaped or circular-shaped manner.

The lifting device may be located internally or externally. In this context, internally refers to a position within the nacelle or within the tower or within the yaw bearing. In other words, the lifting device can not be spotted from outside the wind turbine. However, it is also possible that the lifting device is positioned outside of the wind turbine. For example the lifting device may be placed on a shelf which is running at least partially around the nacelle or the tower.

In a preferred embodiment, the yaw axis and a lifting direction, which is defined by a direction in which the nacelle is lifted relative to the tower, comprise a lifting angle which is between 0° and 20°, in particular between 0° and 10°.

If the nacelle is lifted in a direction relative to the tower which is parallel to the yaw axis, then the lifting angle is 0°. If, however, the nacelle is lifted in a straight movement relative to the tower and a direction of this straight movement is not in parallel with the yaw axis, then the lifting angle is different from 0°. If, in another example, the nacelle is moved in an arc-shaped movement, which is for example the case when the nacelle is moved around a hinge, then the lifting angle is determined by the angle which is comprised by the yaw axis and the final position of the nacelle.

In general, it is advantageous if the lifting device lifts the nacelle substantially vertically relative to the tower.

In another embodiment, the nacelle comprises a weight which exerts a gravitational force on the tower, and the gravitational force of the nacelle is exerted at least partially on the sliding component.

In general, a gliding bearing may comprise different types of bearing pads. These different types of bearing pads include top-axial bearing pads, radial bearing pads and bottom axial bearing pads. Assuming again for example a vertical tower and a nacelle which is placed upon the tower, then the top-axial bearing pad is positioned right between the tower and the nacelle, type of sandwiched in-between the tower and the nacelle. In other words, the top-axial bearing pad extends in a horizontal plane. Bottom-axial bearing pads are substantially parallel to top-axial bearing pads. This means that a bottom-axial bearing pad may also extend substantially in a horizontal plane. However, a difference between the top-axial bearing pad and the bottom-axial bearing pad is that the top-axial bearing pad supports fully or partially the weight of the nacelle. In contrary, the bottom-axial bearing pad solely supports the load which is exerted from e.g. wind pushing the nacelle from the bottom to the top. Finally, a radial bearing pad may extend in a plane which is perpendicular to the horizontal plane of the top-axial bearing pad and the bottom-axial bearing pad.

In an advantageous embodiment therefore, the sliding component refers to a top-axial bearing pad.

Until now, it is mainly the top-axial bearing pad which is difficult and challenging for being removed or exchanged because of the heavy weight of the nacelle which has to be lifted in order to replace the bearing pad. The lifting device as described above may also be used to remove the other types of bearing pads. However, access to these types of bearing pads may already be relatively easy, depending of course on the type of yaw bearing and wind turbine in which they are a part.

Another term for a top-axial bearing pad is a top-axial gliding bearing or a top-sliding shoe. Analogously, the other types of bearing pads may also be referred to as a radial gliding bearing and a bottom-axial gliding bearing, respectively.

In another embodiment, the first yaw bearing component and/or the second yaw bearing component comprises at least one pocket for housing the lifting device.

In principle the pocket may be machined in the first yaw bearing and/or the second yaw bearing. The pocket may for example be grinded into the yaw bearing component. If for example the first yaw bearing component comprises a material which is easier to machine, i.e. to grind, then it is advantageously to place the pocket in the first yaw bearing component.

The pocket may comprise a square shape or a round or curved shape or any other shape. It is advantageous if the shape of the pocket suits and corresponds to the lifting device for which it is arranged and prepared to housing it.

In another embodiment, the first yaw bearing component and/or the second yaw bearing component comprises a yaw ring.

A yaw ring may comprise a shape of a hollow cylinder. It may also comprise a shape of a disc.

Advantageously, the first yaw bearing component comprises a shape of a yaw ring and the yaw ring is placed on an upper rim of the tower.

In a preferred embodiment, the lifting device is a hydraulic lifting device.

In principle, any physical principle can be applied to lift the nacelle relative to the tower. However, a hydraulic lifting device has the advantage that high pressures and lifting capabilities can be generated without relying on too much space and power requirements. In a hydraulic lifting device a hydraulic pressure has to be generated and thus the object is lifted. The hydraulic lifting device may be operated by oil and/or water.

In a preferred embodiment, the first yaw bearing component and/or the second yaw bearing component comprises at least one further pocket for housing at least one further lifting device.

Advantageously, a plurality of lifting devices are used to lift the nacelle relative to the power. For example 5 to 15 lifting devices are used at the same time. Beneficially, exactly one lifting device is placed in one pocket.

In another embodiment, a hydraulic pressure is exerted on the lifting device and a further hydraulic pressure is exerted on the further lifting device. The hydraulic pressure and the further hydraulic pressure are substantially equal. In order to achieve equal hydraulic pressures the lifting device and the further lifting device may be serial connected. This means that with one common pressure generation device both lifting devices are operated. Alternatively, the lifting devices may be operated separately; however, the same hydraulic pressure is applied to both of the lifting devices. In a preferred embodiment, the lifting device comprises a lifting cylinder and an extension nipple for building up the hydraulic pressure.

Exemplarily, a hydraulic torch tool is used for building up the hydraulic pressure. This may be the same hydraulic torch tool which may also be used for securing bolts or screws of the wind turbine. The hydraulic torch tool may be a mobile tool with a weight below 20 kg (kilogramme) such that a man is able to carry it.

The lifting device may be able to lift a weight between 20 t (tons) and 200 t. Furthermore, the lifting device may be able to lift an object by a height of up to 20 mm, in particular up to 8 mm.

In a preferred embodiment, the lifting cylinder comprises substantially a shape of a circular cylinder.

In this context, substantially refers to the fact that the lifting cylinders may have extensions or dents or bumps. The lifting cylinder may for example comprise a diameter of between 5 cm (centimeter) and 25 cm. Furthermore, the lifting cylinder may have a height between 2 cm and 8 cm.

In another embodiment, the wind turbine is a direct drive wind turbine.

The invention is also directed to a method of lifting a nacelle of a wind turbine relative to a tower of the wind turbine. In a preferred embodiment, the method comprises a) lifting the nacelle relative to the tower at least partially by the lifting device, b) removing the sliding component, and c) inserting a replacement sliding component for replacing the removed sliding component.

In other words, the method of lifting the nacelle relative to the tower may beneficially be used for exchanging the sliding component, e.g. the top-axial bearing pad, without a huge effort. This is particularly beneficial in offshore wind turbines. Depending on the size of the sliding component, i.e. a thickness of the sliding component, and depending on the configuration of the yaw bearing where the sliding component is located, it may not be necessary to lift the nacelle relative to the tower by a height which is exceeding several centimeters. Consequently, it may be sufficient that the nacelle is lifted by 5 to 10 mm.

DESCRIPTION OF THE DRAWINGS

Embodiments of the invention are now described, by way of example only, with reference to the accompanying drawings, of which.

The illustrations in the drawings are schematically.

DETAILED DESCRIPTION OF THE DRAWINGS

Figure 1:
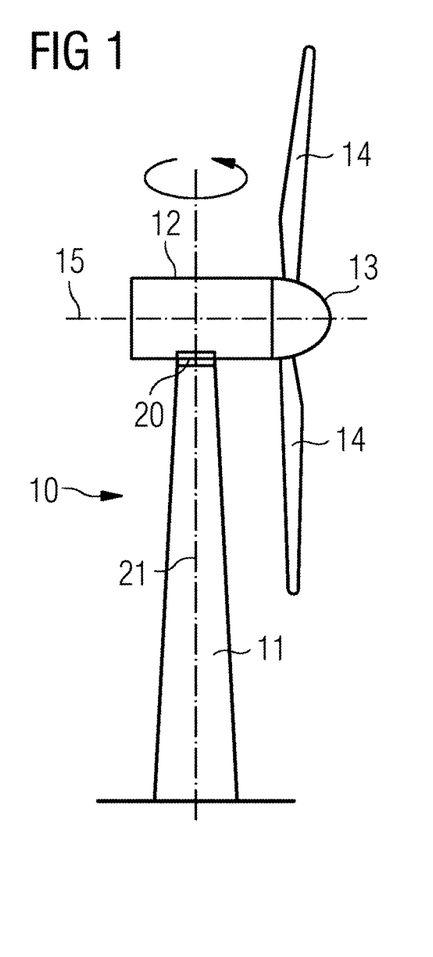
FIG. 1 shows a wind turbine.

Referring to FIG. 1, a wind turbine 10 with a tower 11 and a nacelle 12 is joined with the tower 11 by a yaw bearing 20. The yaw bearing 20 enables a rotation of the nacelle 12 relative to the tower 11 about a yaw axis 21. Furthermore, the wind turbine 10 comprises a hub 13 which is joined or connected by three rotor blades 14 (two of the rotor blades 14 are shown in FIG. 1). The hub 13 is connected with a rotor and is rotatably mounted about a rotor axis of rotation 15.

Figure 2:
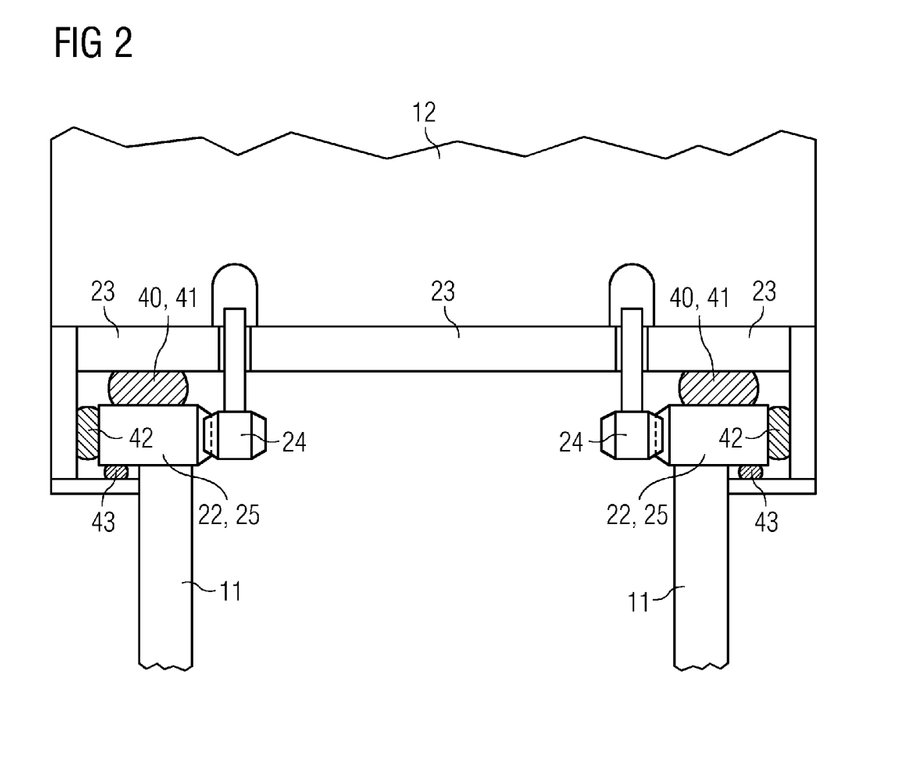
FIG. 2 shows a yaw bearing with an inner yaw drive.

Referring to FIG. 2, a yaw bearing 20 is shown. The yaw bearing 20 comprises a first yaw bearing component 22 which has a shape of a yaw ring 25, and which is directly joined to a tower 11. The yaw bearing 20 also comprises a second yaw bearing 23 which is directly joined to a nacelle 12. The second yaw bearing component 23 can be rotated relative to the first bearing component 22 by a set of inner yaw drives 24. The first yaw bearing component 22 and the second yaw bearing component 23 are in contact by bearing pads.

In FIG. 2, a top-axial bearing pad 41, a radial bearing pad 42 and a bottom-axial bearing pad 43 are depicted. As can be seen, the top-axial bearing pad, acting as a sliding component 40, bears a main load or weight of the nacelle 12. In contrary, the radial bearing pad 42 and the bottom axial bearing pad 43 only bear additional loads exerted on the wind turbine 10.

Figure 3:
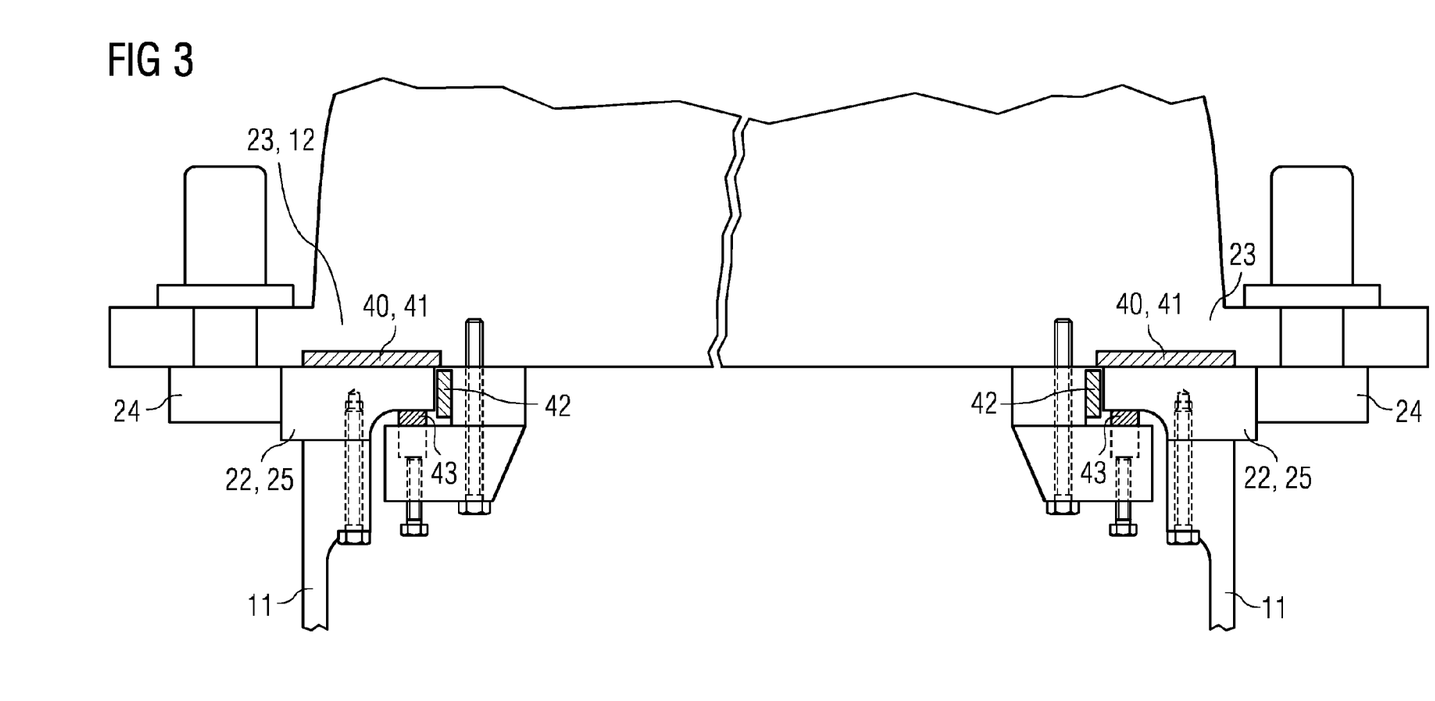
FIG. 3 shows a yaw bearing with an outer yaw drive.

FIG. 3 shows a similar setup of a yaw bearing 20. However, in this embodiment, the yaw drive 24 is arranged outside with regard to walls of the tower 11.

Figure 4:
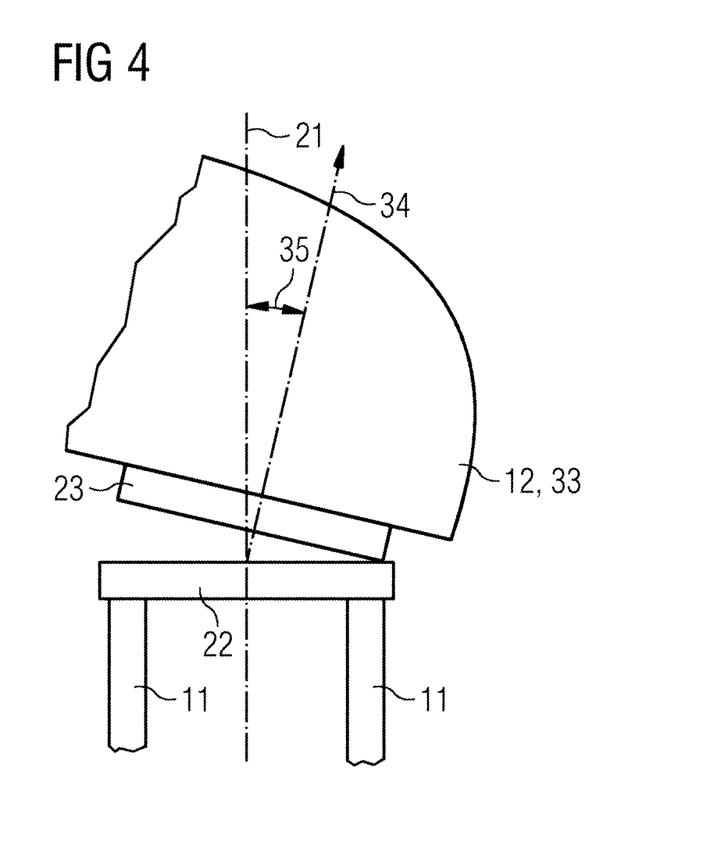
FIG. 4 shows a lifting angle between a lifting direction and a yaw axis.

In FIG. 4, a lifting angle 35 comprised by a yaw axis 21 and a lifting direction 34 is illustrated. It can be seen that a lifting device 31 (not shown) acts similarly to a hinge and tilts the nacelle 12 relative to the tower 11 of the wind turbine 10. Again, a first yaw bearing component 22 is joined with the tower 11 and a second yaw bearing component 23 is joined with the nacelle 12. More specifically, the second yaw bearing component 23 is directly joined with a support structure 33 of the wind turbine 10. The support structure 33 is a part of the nacelle 12. The support structure 33 comprises in the example shown in FIG. 4 a shape of a swan neck. Exemplarily, the lifting angle 35 comprises 12°.

Figure 5:
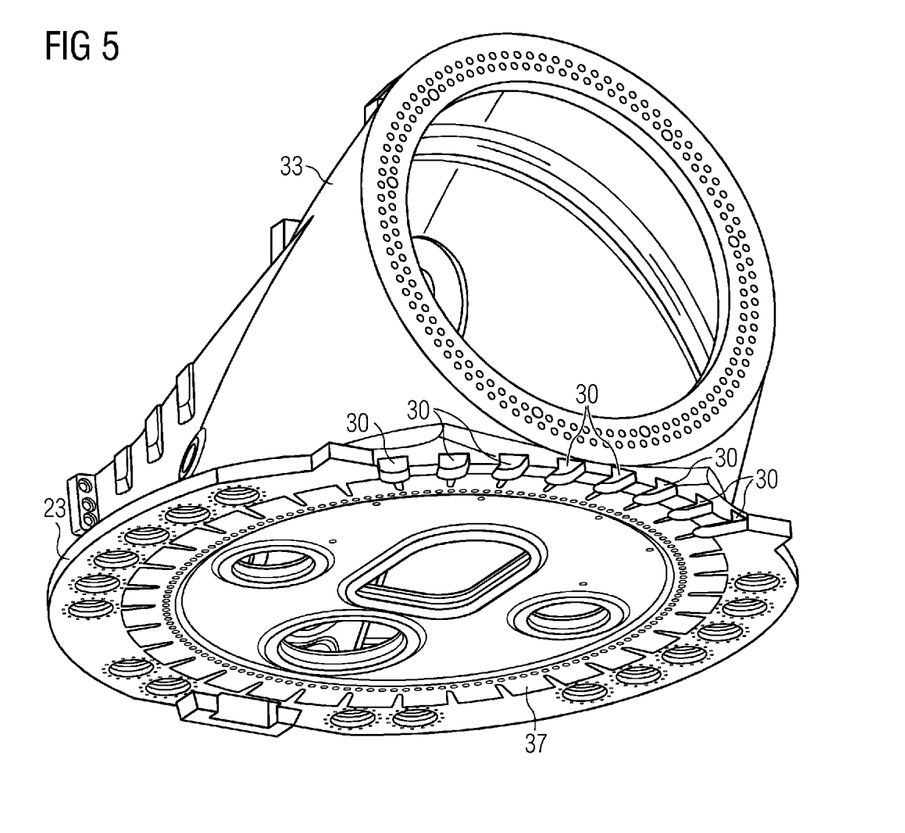
FIG. 5 shows a second yaw bearing component with a plurality of pockets.

Referring to FIG. 5, a second yaw bearing component 23 joined with a support structure 33, again comprising a shape of a swan neck, is shown. The second yaw bearing component 23 shown in FIG. 5 is a part of a wind turbine 10 which is able to generate an electrical power of 6 MW. The second yaw bearing component 23 comprises a shape which is also called a bed frame or bed plate or base frame. The second yaw bearing component 23 is arranged and prepared to house sliding components in a sliding component pocket 37. In this example, 34 sliding component pockets 37 are shown. In one section of the second yaw bearing component 23 eight pockets 30 have been grinded into a second yaw bearing component 23. The pockets 30 have a shape of a square with one side rounded or curved.

A sliding component may exemplarily have the following dimensions: 310 mm times 243 mm times 15 mm. A material of the sliding component may comprise nylon.

Figure 6:
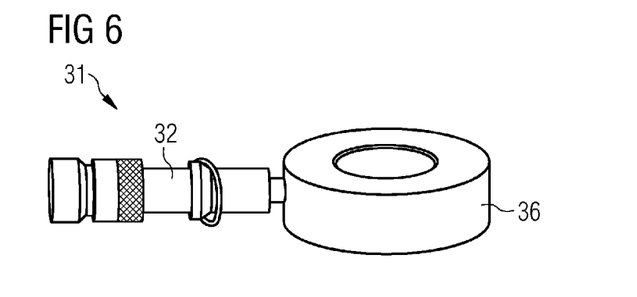
FIG. 6 shows a lifting device.

Referring to FIG. 6, an exemplary lifting device 31 comprising an extension nipple 32 and a lifting cylinder 36 is shown. The lifting cylinder 36 comprises a shape of a hollow circular cylinder. It comprises an outer diameter of 200 mm and an inner diameter of 100 mm. It furthermore comprises a height of 65 mm. The lifting device 31 as shown in FIG. 6 comprises a stroke of 6 mm and comprises a capacity of lifting up to 100 t. A working pressure of 700 bar is needed to operate the lifting device 31 shown in FIG. 5.

Thus, if all eight pockets 30 of the second yaw bearing component 23 as shown in FIG. 5 are filled with lifting devices 31, a total lifting capacity of up to 800 t is possible. This enables to lift a nacelle of a wind turbine weighing up to 800 t by a lifting height of up to 6 mm. It shall be stressed that the lifting height of up to 6 mm is sufficient to remove and exchange the sliding component 40 of the yaw bearing 20.

The invention claimed is:

1. A wind turbine comprising
   a tower;
   a nacelle;
   at least one lifting device located internally within the wind turbine;
   at least one rotor blade configured to rotate about a rotor axis of rotation; and
   a yaw bearing;
   wherein the yaw bearing is adapted for rotating the nacelle relative to the tower around a yaw axis offset from the rotor axis of rotation;
   the yaw bearing comprises a first yaw bearing component which is fixed to the tower, a second yaw bearing component which is fixed to the nacelle, and at least one sliding component which is located between the first yaw bearing component and the second yaw bearing component; and
   the wind turbine is adapted for housing the at least one lifting device for lifting the nacelle relative to the tower such that the sliding component can be removed.

2. The wind turbine according to claim 1, wherein the yaw axis and a lifting direction, which is defined by a direction in which the nacelle is lifted by the at least one lifting device relative to the tower, comprise a lifting angle which is between 0 degree and 20 degrees.

3. The wind turbine according to claim 1, wherein the wind turbine comprises a plurality of bearing pads including:
   a top axial bearing pad including the at least one sliding component positioned between the tower and the nacelle, wherein the nacelle comprises a weight which exerts a gravitational force on the tower, and the gravitational force of the nacelle is exerted at least partially on the top axial bearing pad;
   a bottom axial bearing pad substantially parallel to the top axial bearing pad; and
   a radial bearing pad that extends in a plane that is perpendicular to a plane of the top axial bearing pad and the bottom axial bearing pad;
   wherein the wind turbine is adapted for housing the at least one lifting device internally within the wind turbine for lifting the nacelle relative to the tower such that the top axial bearing pad can be removed.

4. The wind turbine according to claim 1, wherein the second yaw bearing component comprises at least one sliding component pocket to house the at least one sliding component and at least one pocket other than the at least one sliding component pocket for housing the at least one lifting device.

5. The wind turbine according to claim 3, wherein the top axial bearing pad is sandwiched between the tower and the nacelle and extends in a horizontal plane, the bottom axial bearing pad extends in a plane that is parallel to the horizontal plane and the radial bearing pad extends in the plane that is perpendicular to the horizontal plane.

6. The wind turbine according to claim 1, wherein the at least one lifting device is a hydraulic lifting device.

7. The wind turbine according to claim 1, further comprising at least one further lifting device located internally within the wind turbine, wherein the first yaw bearing component and/or the second yaw bearing component comprises at least one further pocket for housing the at least one further lifting device.

8. The wind turbine according to claim 7, wherein
a hydraulic pressure is exerted on the lifting device,
a further hydraulic pressure is exerted on the further lifting device, and
the hydraulic pressure and the further hydraulic pressure are substantially equal.

9. The wind turbine according to claim 8, wherein the lifting device and the further lifting device each comprise a lifting cylinder and an extension nipple for building up the hydraulic pressure.

10. The wind turbine according to claim 9, wherein the lifting cylinder comprises substantially a shape of a circular cylinder.

11. The wind turbine according to claim 1, wherein the wind turbine is a direct drive wind turbine.

12. A method of lifting a nacelle of a wind turbine according to claim 1, comprising
lifting the nacelle relative to the tower.

13. The method according to claim 12, wherein the lifting the nacelle relative to the tower is at least partially performed by the lifting device and wherein the method further comprises
removing the sliding component after the lifting of the nacelle relative to the tower, and
inserting a replacement sliding component for replacing the removed sliding component.

14. The method according to claim 13, wherein the method further comprises positioning the at least one lifting device internally within the wind turbine such that the at least one lifting device cannot be spotted from outside of the wind turbine.

15. The method according to claim 14, wherein the positioning step comprises forming at least one pocket in the second yaw bearing component such that a shape of the at least one pocket corresponds to a shape of the at least one lifting device and positioning the at least one lifting device within the at least one pocket.

16. The wind turbine according to claim 1, wherein the yaw axis is approximately aligned with the tower and the yaw axis is approximately orthogonal to the rotor axis of rotation.

17. A wind turbine comprising
a tower;
at least one lifting device;
a nacelle comprising a housing for a generator; and
a yaw bearing comprising at least one sliding component between the tower and the nacelle;
wherein the yaw bearing is adapted for rotating the nacelle relative to the tower around a yaw axis;
wherein the wind turbine is adapted for housing the at least one lifting device for lifting the nacelle relative to the tower such that the sliding component can be removed; and
wherein the at least one lifting device is located internally within the wind turbine, wherein the yaw axis and a lifting direction, which is defined by a direction in which the nacelle is lifted by the at least one lifting device relative to the tower, comprise a lifting angle which is between 0 degree and 20 degrees.

18. The wind turbine according to claim 17, wherein the yaw bearing comprises a first yaw bearing component which is fixed to the tower, a second yaw bearing component which is fixed to the nacelle, wherein the at least one sliding component is located between the first yaw bearing component and the second yaw bearing component.

19. The wind turbine according to claim 18, wherein the second yaw bearing component comprises at least one pocket with a shape corresponding to a shape of at least one lifting device for housing the at least one lifting device in at least one pocket.

* * * * *